Nov. 2, 1943.　　　　　G. H. FISHER　　　　2,333,164
FLUID FLOW METER MECHANISM
Filed May 17, 1941　　　　2 Sheets-Sheet 1
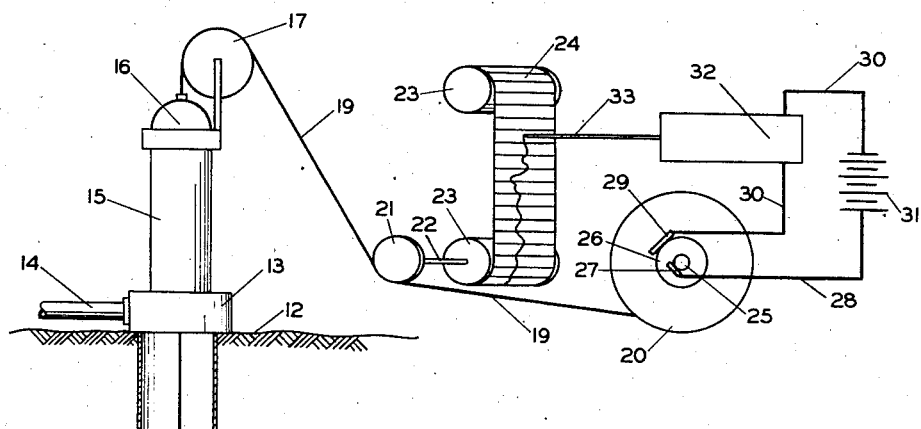
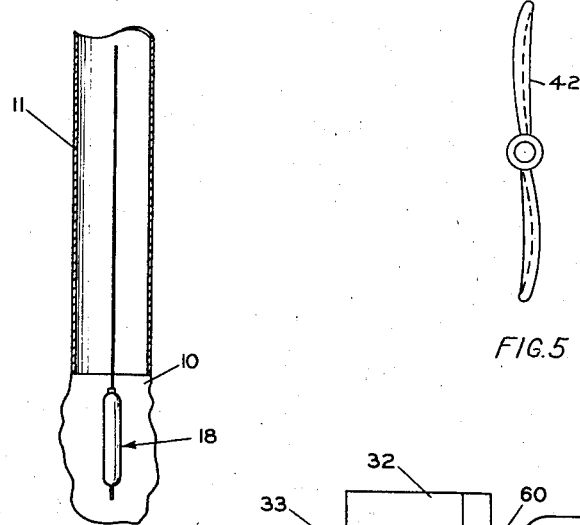
FIG. 1
FIG. 5
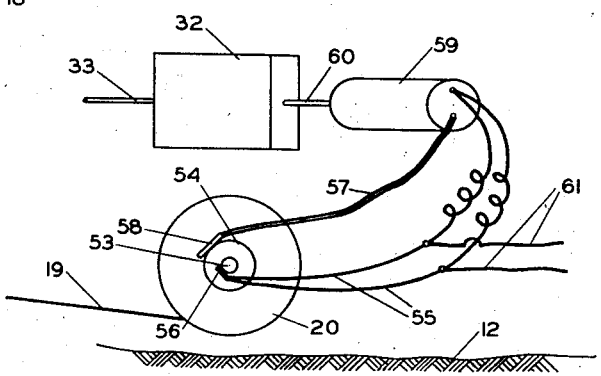
FIG. 4
INVENTOR
G. H. FISHER
BY
Hudson, Young, Shanley & Yuiger
ATTORNEY

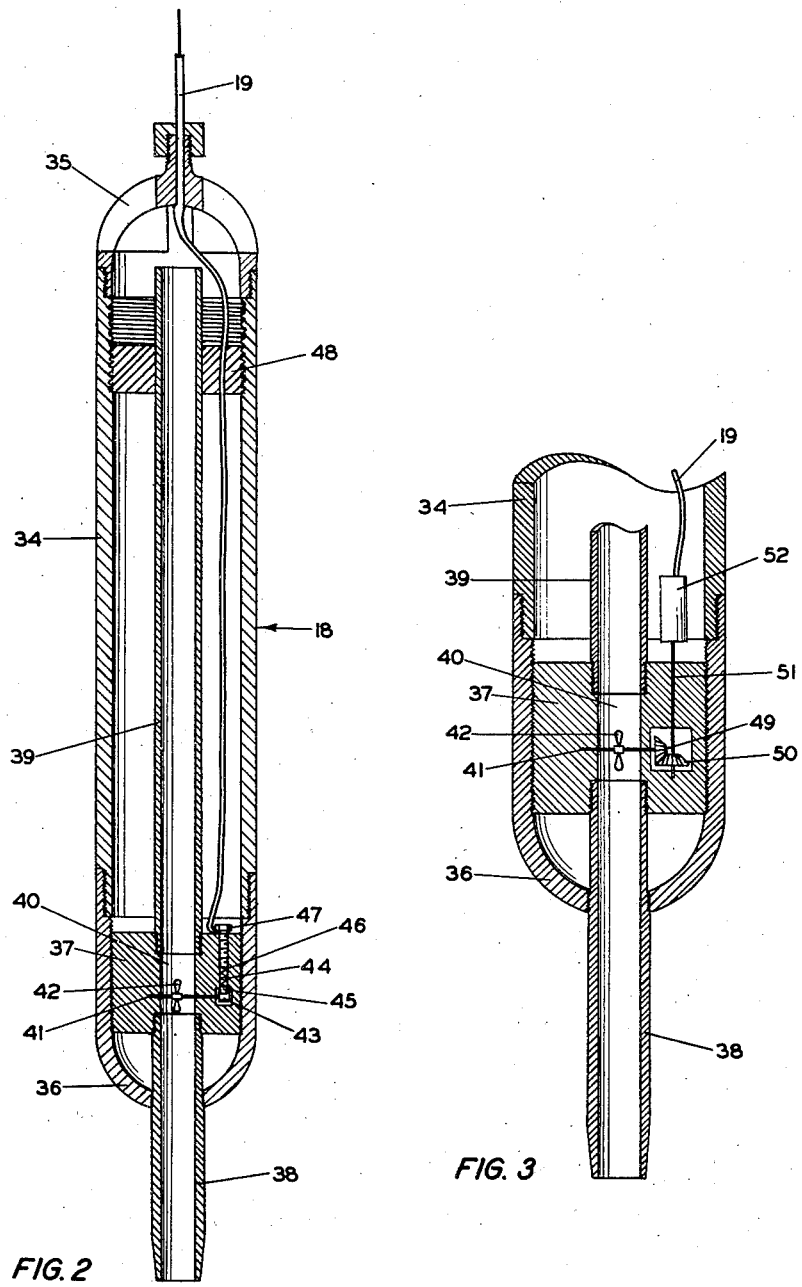

Patented Nov. 2, 1943

2,333,164

UNITED STATES PATENT OFFICE 2,333,164

FLUID FLOW METER MECHANISM

Gordon H. Fisher, Dewey, Okla., assignor to Phillips Petroleum Company, a corporation of Delaware Application May 17, 1941, Serial No. 394,040

4 Claims. (Cl. 73—198)

This invention relates to the measurement of fluid flow and more particularly to an apparatus for measuring the rate of fluid flow through various types of passages, including well bores, casing and the like.

It is often to the interest of the operator of a hydrocarbon oil or gas property to know the rate of flow of fluid at various depths in a well bore, especially in the bottom of the well bores, as a hydrocarbon-bearing formation is usually not productive of hydrocarbon fluids throughout its entire thickness. The productive zones may also vary in their capacity to produce fluid. A knowledge of these conditions enables the operator to better conserve the natural reservoir energy and to more efficiently operate his wells. Further, in the event of pressure maintenance or secondary recovery operations, it is important for the operator to know which zones are productive of hydrocarbon fluid, because it is into these zones that fluid, which is used for secondary recovery or pressure maintenance, may be injected.

By the practice of my invention, I am able to observe the rate of fluid flow from the various productive zones of a hydrocarbon-bearing formation, which is penetrated by a well bore, and thereby locate the productive and the non-productive zones. I am also able to observe the rate of fluid flow in other parts of the well bore, such as in the casing. It will be noted that the rate of fluid flow may be indicated on a chart at the surface of the ground, together with the depth of the fluid velocity measurement. This will provide information which will be very useful in determining the proper methods of recovering hydrocarbon fluids from underground formations. My invention is also very useful in determining the flow of fluid into a reservoir during secondary recovery operations. My device is simple in construction and operation and may be readily transported from place to place.

My invention has for its primary object the provision of an apparatus for measuring the rate of fluid flow through various types of passages, including well bores, casing and the like.

Another object of my invention is to provide an apparatus for locating the productive zones of a hydrocarbon-bearing formation and for determining the rate of fluid flow therefrom.

A still further object of my invention is the provision of an apparatus to determine the rate of flow of fluid from a well bore to a formation.

These and additional objects and advantages will be apparent to persons skilled in the art by reference to the following description and annexed drawings which pertain to preferred embodiments of my invention, wherein Figure 1 is an elevation view, partly in cross section of one embodiment of my invention;

Figure 2 is an enlarged elevation view, partly in cross section of the flow device shown in Figure 1;

Figure 3 is an enlarged elevation view, partly in cross section of the flow device employed in a second embodiment of my invention; and Figure 4 is a plan view of part of the surface equipment employed in the second embodiment of my invention.

Figure 5 is an end view of the impeller shown in Fig. 2.

Referring to the drawings, and more particularly to Figure 1, I have shown a well bore which is designated by reference numeral 10. The well bore is provided with well casing 11 which extends downwardly from the surface of the ground 12. A closure 13, which is provided with an outlet conduit 14, is threadedly connected to the upper end of the casing and is adapted to connect with a substantially vertical tubular member or "lubricator" 15, which is closed at the top by a stuffing box 16. The stuffing box is preferably provided with a pulley 17. It will be noted that the above apparatus provides a closed system whereby any fluid in well bore 10 may flow upwardly through the casing and be withdrawn through conduit 14 to any desired disposal apparatus (not shown). Reference numeral 18 generally designates a flow device, which will be described further along in this specification. Flow device 18 is lowered into the well bore from the surface of the ground by means of a conductor cable 19, which is spooled on a drum 20. The drum is rotated by any known means (not shown) to "run" the flow meter in and out of the well bore at the will of the operator. It is to be noted that the cable passes through the lubricator and stuffing box which are used to facilitate the running of the flow meter in the well bore. A depth measurement device 21 is placed intermediate pulley 17 and drum 20 and is actuated by the cable to indicate the depth of the flow meter as it is "run" in and out of the well bore. Measuring device 21 is connected by any suitable means, such as a shaft 22, to a pair of chart drums 23 which carry a chart 24. Drum 20 is provided with a plurality of slip rings 25 and 26 which are connected to the conductor cable that is spooled on the drum. Slip ring 25 contacts a brush 27 which is attached to a lead 28 and slip ring 26 contacts a brush 29 which is attached to a lead 30. Leads 28 and 30 connect to a source of electric energy, such as a battery 31, which is used in this embodiment of my invention to electrically transfer the changes in the fluid velocity from flow device 18 to the surface of the ground. An indicating device 32 utilizes the electrical energy in lead 30 in such a manner that it will cause a stylus 33 to indicate on chart 24 the rate of fluid flow through device 18. It is obvious that the chart may be calibrated to read in any desired units, such as barrels per day.

The indicating device 32 may be of the type disclosed in the patent to Howell 2,288,278 which utilizes a frequency meter which is responsive to pulsations in an electrical circuit and connected with a recorder. If desired a photographic type recorder shown in the patent may be employed in place of the stylus type shown in Figure 1. However, no novelty is claimed in the structure of such devices per se since they are quite well known.

Turning next to Figure 2 for a description of the flow device, it will be noted that the device consists of a hollow outer tube 34 which is threadedly connected at the upper end to a spider top 35 and at the lower end to a base 36. An insert 37 is positioned within the base and is provided with a central passage 40 that is tapped at the bottom to receive an intake flow tube 38, and that is similarly tapped at the top to engage with a discharge flow tube 39 which extends upwardly to the top of outer tube 34. It is to be noted that the intake and discharge tubes and the central passage preferably have equal internal diameters to provide a substantially even flow of fluid therethrough. A rotatable shaft 41, which is journaled in the central portion of the insert and which is positioned diametrically across passage 40, has an impeller 42 rigidly mounted thereon, which may freely rotate in passage 40. One end of shaft 41 is secured to a commutator 43 which rotates with the turning of the shaft. The commutator makes and breaks an electric circuit including the cable 19, leads 28 and 30, and battery 31. It will be noted that the following parts of my apparatus are used and described in pairs, however, only one of each of these pairs is shown in the drawings: A pair of openings 44 is provided in the insert to accommodate a pair of brushes 45 which is urged against the commutator by a pair of conductor springs 46, which in turn is held in place by a pair of terminal screws 47. The terminal screws are connected with the leads of conductor cable 19. The lower end of the cable passes through a packing element 48 to the terminal screws to which the leads of the cable are attached.

In operation, the apparatus illustrated in Figures 1 and 2 is assembled at the surface of the ground. Let us assume that it is desired to determine the rate of flow of well fluid upwardly through bore 10 and casing 11. Device 18 is lowered through the casing and the well bore at a uniform rate of speed by means of cable 19. A proportional amount of the total fluid flowing past device 18 will enter fluid intake tube 38 and flow upwardly through the intake tube, passage 40, fluid discharge tube 39, and spider 35. The flow of fluid through passage 40 rotates impeller 42, which rotates commutator 43. The rotation of the commutator makes and breaks the electric circuit so that the electric current supplied by battery 31 actuates indicating device 32. As stylus 33 is responsive to the indicating device, the rate of rotation of impeller 42 may be indicated on chart 24 in any desired units of rate of flow by proper calibration of the chart. Chart 24 also indicates the depth of the flow device, as the chart drums are suitably connected to depth measuring device 21. Thus, a continuous log of the rate of fluid flow may be obtained for the entire depth of the bore hole, as the device is lowered into or withdrawn from the well bore.

Turning next to Figures 3 and 4 for the description of the second embodiment of my invention, it will be noted that like numerals refer to like parts of the two embodiments. In Figure 3, shaft 41 is secured to a bevel gear 49 which meshes with a second bevel gear 50 that is secured to a substantially vertical shaft 51. Shaft 51 is journaled in insert 37 and has a well known self-synchronous generator, such as a "Selsyn" generator 52, mounted on the upper end. The leads of conductor cable 19 are connected to generator 52 in any manner well known in the art. Referring to Figure 4, drum 20 is provided with slip rings 53 and 54 which make a sliding contact between the primary and secondary leads of conductor cable 19, and primary leads 55 by means of brushes 56, and secondary leads 57 by means of brushes 58, respectively. Leads 55 and 57 connect to a "Selsyn" motor 59 which is employed in this embodiment to actuate indicating device 32 by any suitable means, such as shaft 60. It will be noted that a source of single phase alternating current (not shown) is connected into the primary circuit by lines 61.

The operation of this embodiment of my invention is identical in principle to that already disclosed, except that of transferring the changes in the fluid velocity from flow device 18 to the surface of the ground. The rotation of shaft 41 rotates Selsyn generator 52. The rotation of Selsyn generator 52 in turn causes Selsyn motor 59 to rotate at identical speeds. This is an inherent characteristic of Selsyn generators and motors. Indicating device 32 utilizes the rotation of shaft 60 to register the rate of rotation of the impeller in flow device 18 on chart 24 which is calibrated to indicate thereon in desired units the rate of fluid flow through the flow device.

During injection of the fluid into an underground reservoir in secondary recovery operations, both of the above described embodiments of this invention may be readily employed to determine the rate of fluid flow at various levels in a well bore. When my invention is utilized for this purpose, the passage of fluid through the well bore and through device 18 is in a reverse direction, namely, downwardly through the well bore and the device. At such times, tube 39 serves as the intake flow tube while tube 38 serves as the discharge flow tube. The apparatus operates as outlined earlier in this specification in all other respects.

From the foregoing, it is believed that the operation and advantages of the apparatus for practicing my instant invention will be readily comprehended by persons skilled in the art. It is to be clearly understood, however, that various changes in the apparatus shown and described may be resorted to without departing from the spirit of the invention, as defined by the appended claims.

I claim:

1. In apparatus of the character described adapted for indicating and recording a wide range of fluid flow, the combination comprising a case adapted to be moved through a well bore, a flow tube of substantially uniform diameter throughout its length extending through the case and including a fluid inlet and a fluid outlet adapted for substantially unrestricted flow of well fluid therethrough, an impeller disposed in said flow tube and rotatable at a rate proportional to the flow of fluid, means disposed within the case and removed from the path of fluid flow including a rotatable member connected with said impeller adapted to generate impulses in an electrical circuit proportional to the rate of fluid flow through said flow tube and means exterior to the well bore for continuously recording variations in the rate of well fluid flow through said flow tube in proportion to the rate at which said impulses are generated.

2. In apparatus of the character described adapted for indicating and recording a wide range of fluid flow, the combination comprising a case adapted to be moved through a well bore, a flow tube of substantially uniform diameter throughout its length extending through the case and including a fluid inlet and a fluid outlet adapted for substantially unrestricted flow of well fluid therethrough, packing elements maintaining said flow tube centrally disposed in said case, an impeller disposed on a horizontal axis in said flow tube and rotatable at a rate proportional to the flow of fluid, means disposed within the case and removed from the path of fluid flow including a rotatable commutator connected with said impeller, brushes associated with said commutator so that rotation of the commutator will generate impulses in an electrical circuit proportional to the rate of fluid flow through said flow tube and means exterior to the well bore for continuously recording variations in the rate of well fluid flow through said flow tube in proportion to the rate at which said impulses are generated.

3. In apparatus of the character described adapted for indicating and recording a wide range of fluid flow, the combination comprising a case adapted to be moved through a well bore, a flow tube of substantially uniform diameter throughout its length extending through the case and including a fluid inlet and a fluid outlet adapted for substantially unrestricted flow of well fluid therethrough, packing elements maintaining said flow tube centrally disposed in said case, an impeller disposed on a horizontal axis in said flow tube and rotatable at a rate proportional to the flow of fluid, means disposed within the case and removed from the path of fluid flow including a rotatable commutator connected with said impeller, brushes associated with said commutator so that rotation of the commutator will generate impulses in an electrical circuit proportional to the rate of fluid flow through said flow tube and a frequency meter for continuously recording variations in the rate of well fluid flow through said flow tube in proportion to the rate at which said impulses are generated.

4. In apparatus of the character described adapted for indicating and recording a wide range of fluid flow, the combination comprising a case adapted to be moved through a well bore, a flow tube of substantially uniform diameter throughout its length extending through the case and including a fluid inlet and a fluid outlet adapted for substantially unrestricted flow of well fluid therethrough, packing elements maintaining said flow tube centrally disposed in said case, an impeller disposed on a horizontal axis in said flow tube and rotatable at a rate proportional to the flow of fluid, a Selsyn generator disposed within the case connected with the impeller for generating impulses in an electrical circuit proportional to the rate of fluid flow through said flow tube, a Selsyn motor connected in the electrical circuit at a point exterior to the well bore and operating in synchronism with the generator and means connected with the Selsyn motor for continuously recording variations in the rate of well fluid flow through said flow tube in proportion to the rate at which said impulses are generated.

GORDON H. FISHER.